(12) United States Patent
Mohara et al.

(10) Patent No.: US 12,535,412 B2
(45) Date of Patent: Jan. 27, 2026

(54) FAR-INFRARED SPECTROSCOPY DEVICE AND SAMPLE ADAPTER

(71) Applicant: Hitachi High-Tech Corporation, Tokyo (JP)

(72) Inventors: Mizuki Mohara, Tokyo (JP); Kei Shimura, Tokyo (JP); Touya Ono, Tokyo (JP); Kenji Aiko, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 118 days.

(21) Appl. No.: 18/569,861

(22) PCT Filed: Jul. 20, 2021

(86) PCT No.: PCT/JP2021/027218
§ 371 (c)(1),
(2) Date: Dec. 13, 2023

(87) PCT Pub. No.: WO2023/002585
PCT Pub. Date: Jan. 26, 2023

(65) Prior Publication Data
US 2024/0288365 A1    Aug. 29, 2024

(51) Int. Cl.
*G01N 21/3581* (2014.01)
*G01N 21/25* (2006.01)

(52) U.S. Cl.
CPC ....... *G01N 21/3581* (2013.01); *G01N 21/255* (2013.01)

(58) Field of Classification Search
CPC ............. G01N 21/3581; G01N 21/255; G01N 21/0303; G01N 21/3586
See application file for complete search history.

(56) References Cited

U.S. PATENT DOCUMENTS 10,101,260 B2 * 10/2018 Reed .................. G01N 15/1434
2013/0078150 A1    3/2013 Obata
(Continued)

FOREIGN PATENT DOCUMENTS

| JP | 2003-194709 A | 7/2003 |
| JP | 2011-257156 A | 12/2011 |

(Continued)

OTHER PUBLICATIONS

JP2014196966A_translation with paragraph numbers (Year: 2014).*

(Continued)

*Primary Examiner* — Tarifur R Chowdhury
*Assistant Examiner* — Carlos Perez-Guzman
(74) *Attorney, Agent, or Firm* — Crowell & Moring LLP

(57) ABSTRACT

Provided are a far-infrared spectroscopy device and sample adapter that make it possible to highly accurately measure a sample that is not flat. A far-infrared spectroscopy device according to this invention comprises an illumination optical system for concentrating far-infrared light onto a sample and a detector for detecting light that has passed through the sample. Sample adapters are placed on the optical path of the far-infrared light between the illumination optical system and the sample and on the optical path between the sample and a detection optical element. The front surfaces of the sample adapters are roughly flat, and the shapes of the sample-side surfaces of the sample adapters roughly match the shape of the sample. The surface of the sample that the far-infrared light is concentrated on and the surface that the far-infrared light passes through are curved.

7 Claims, 8 Drawing Sheets

(56) References Cited

U.S. PATENT DOCUMENTS

| | | |
|---|---|---|
| 2014/0291524 A1 | 10/2014 | Kubota et al. |
| 2016/0161403 A1 | 6/2016 | Sugimoto |
| 2018/0209848 A1 | 7/2018 | Shimura et al. |
| 2020/0371023 A1 | 11/2020 | Shimura et al. |
| 2022/0412885 A1 | 12/2022 | Mohara et al. |

FOREIGN PATENT DOCUMENTS

| | | | |
|---|---|---|---|
| JP | 2014-196966 A | 10/2014 | |
| JP | 2014-209094 A | 11/2014 | |
| JP | 2016-109670 A | 6/2016 | |
| JP | 2020-51915 A | 4/2020 | |
| WO | WO 2017/013759 A1 | 1/2017 | |
| WO | WO-2019038823 A1 * | 2/2019 | ......... G01N 21/3581 |
| WO | WO 2019/116461 A1 | 6/2019 | |
| WO | WO 2021/131014 A1 | 7/2021 | |

OTHER PUBLICATIONS

WO_2019038823_A1_translation with page numbers (Year: 2019).*
International Search Report (PCT/ISA/210) issued in PCT Application No. PCT/JP2021/027218 dated Oct. 12, 2021 with English translation (6 pages).
Japanese-language Written Opinion (PCT/ISA/237) issued in PCT Application No. PCT/JP2021/027218 dated Oct. 12, 2021 with English translation (7 pages).

* cited by examiner

[FIG. 1A]
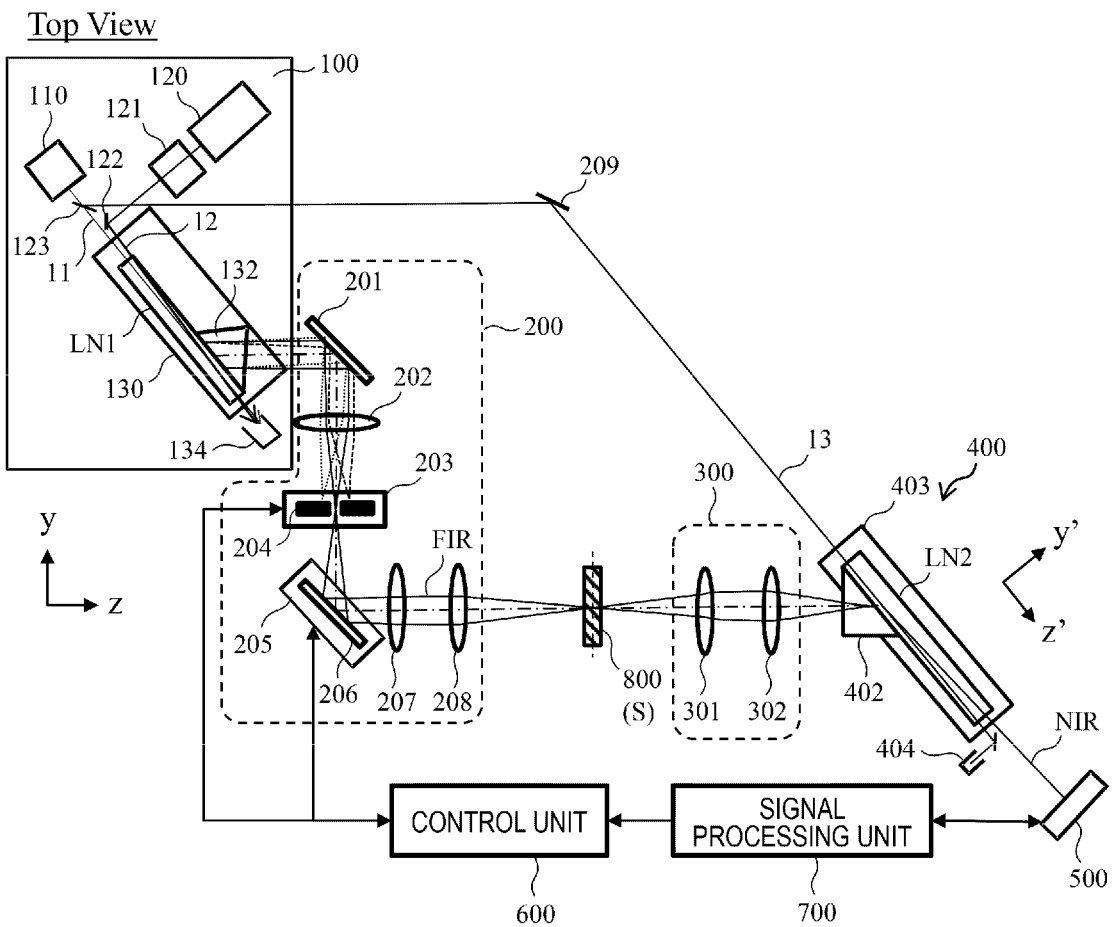
[FIG. 1B]
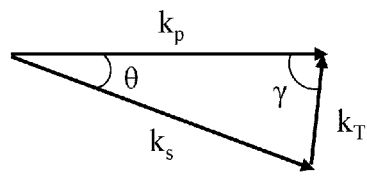

[FIG. 2A]
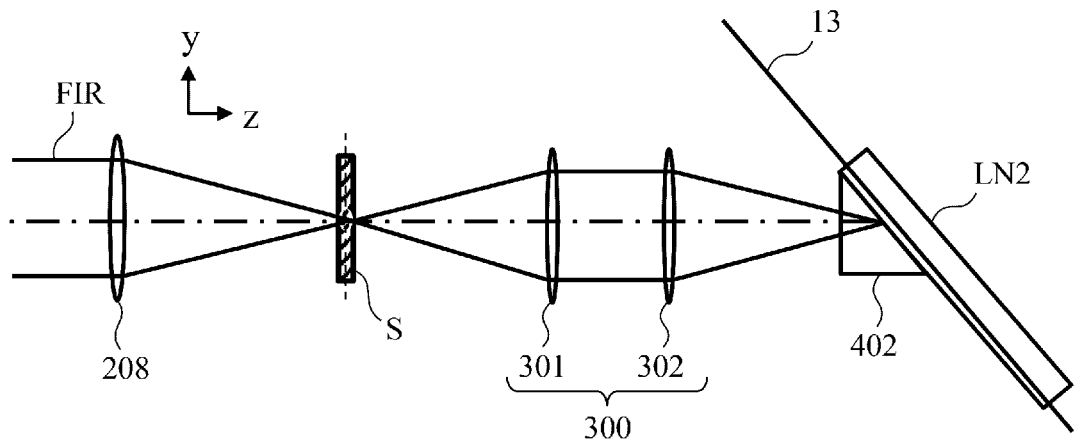
[FIG. 2B]
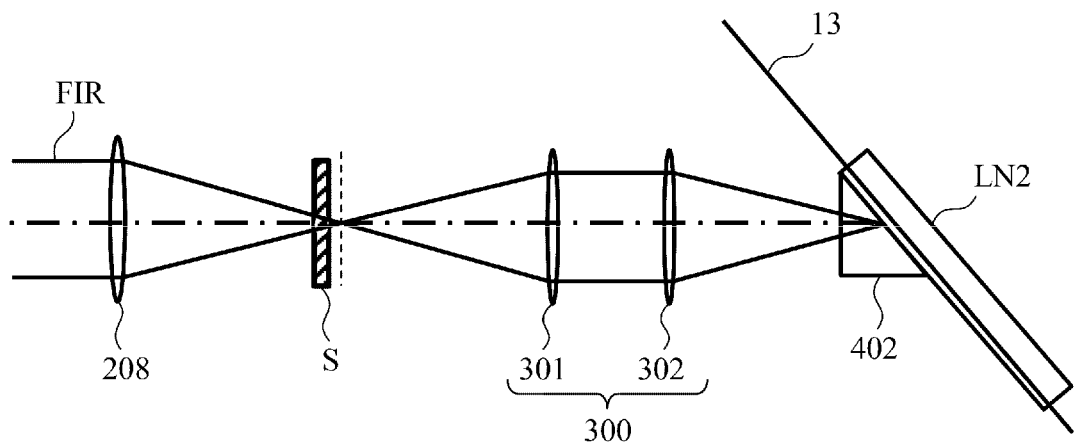
[FIG. 2C]
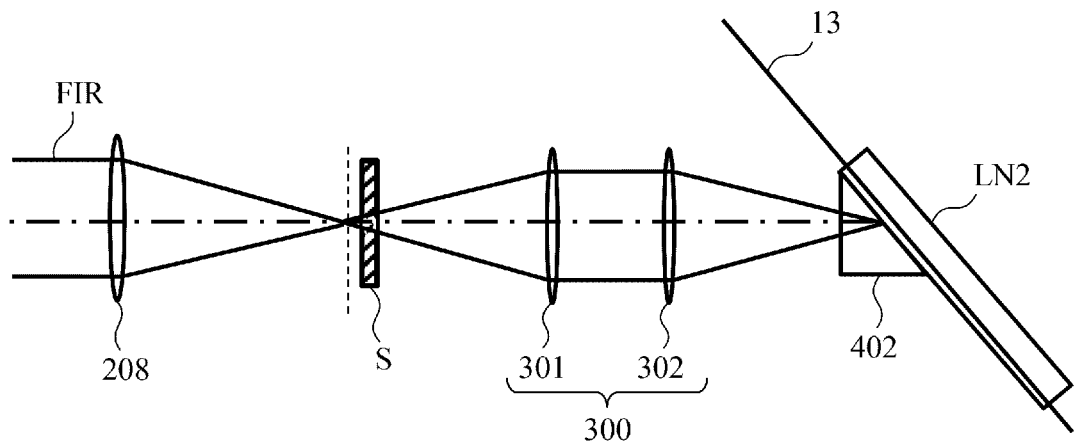

[FIG. 3A]
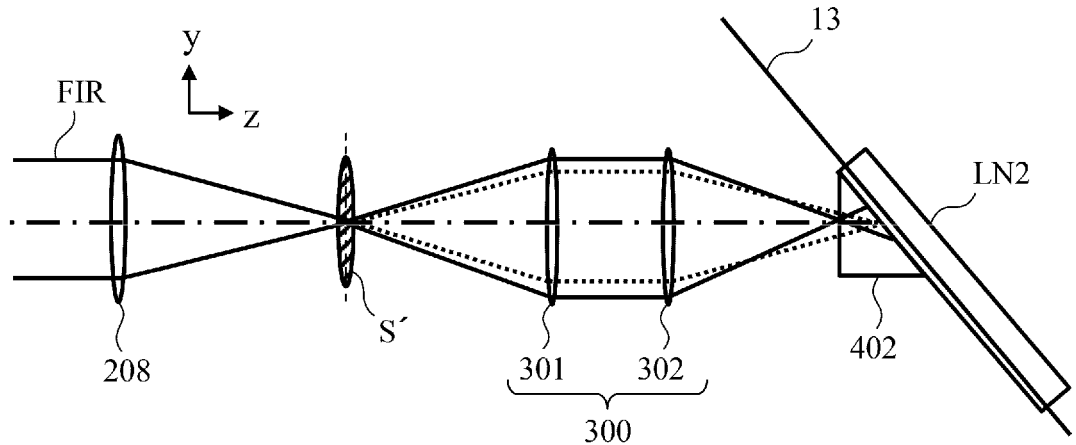
[FIG. 3B]
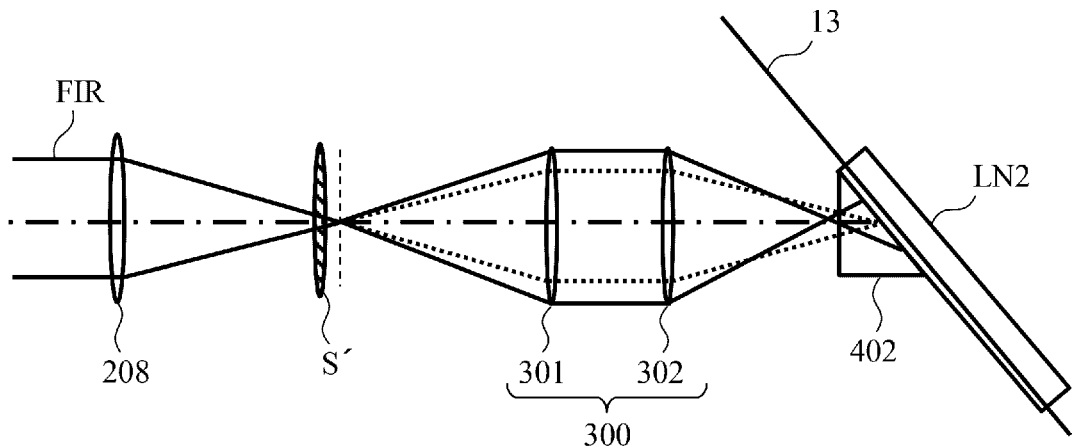
[FIG. 3C]
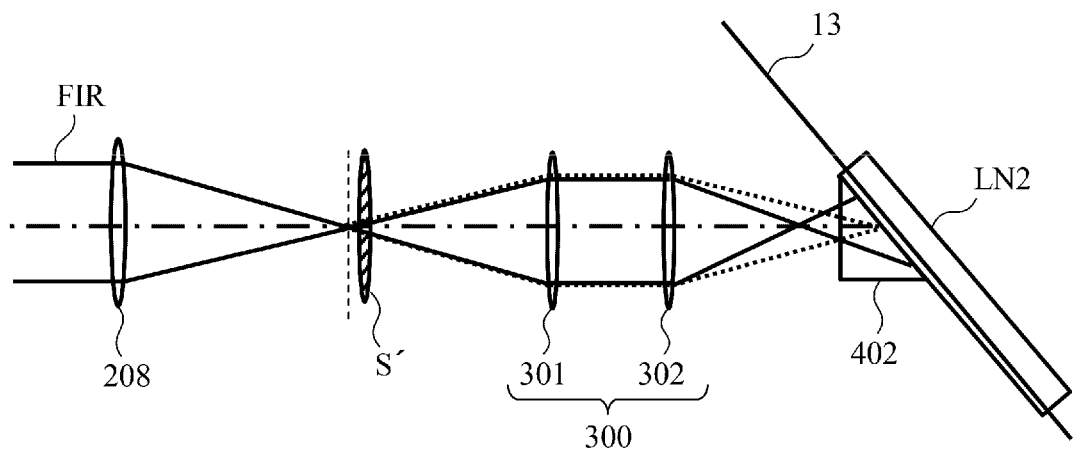

[FIG. 4A]
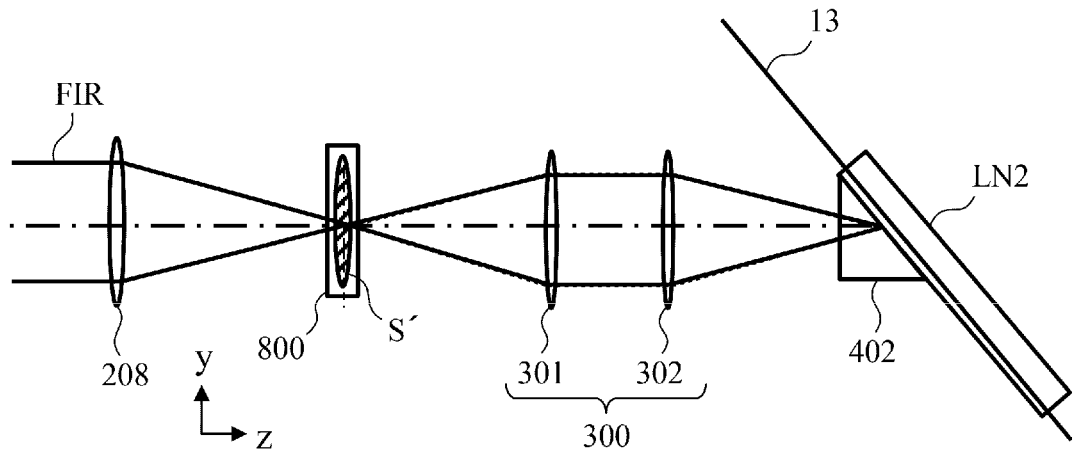
[FIG. 4B]
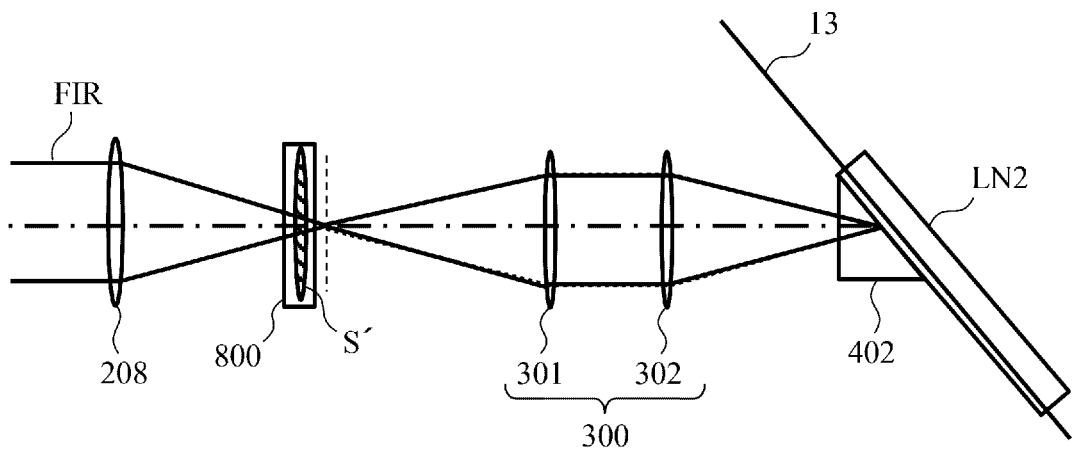
[FIG. 4C]
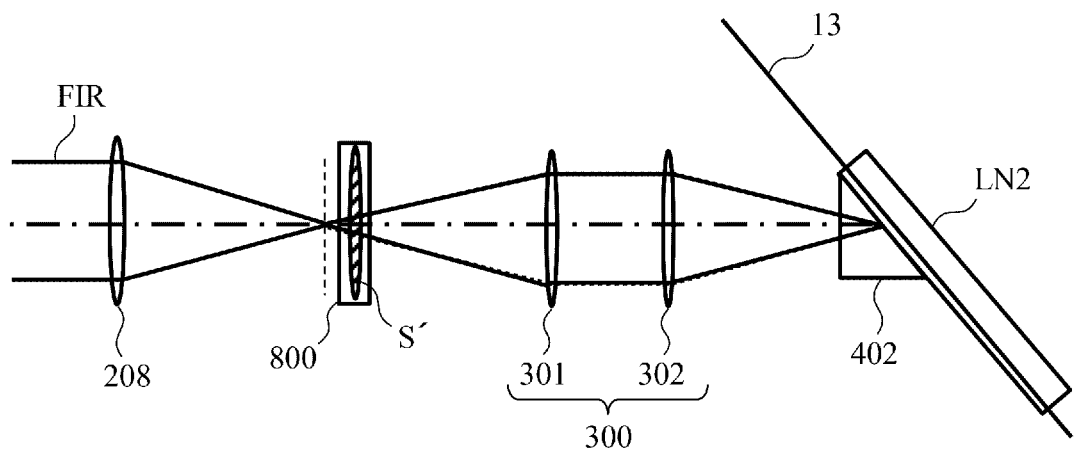

[FIG. 5]
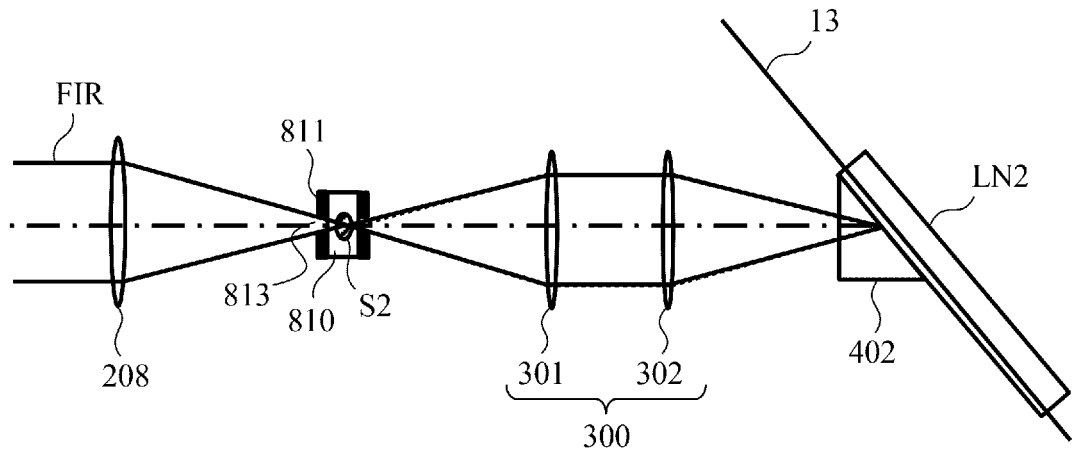
[FIG. 6A]
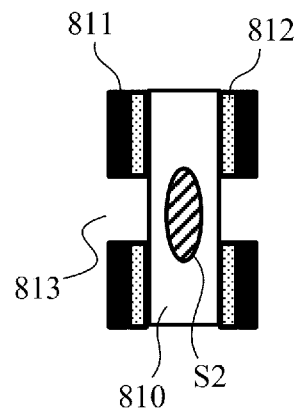
[FIG. 6B]
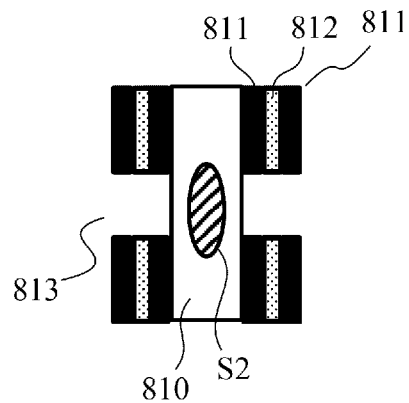

[FIG. 7A]
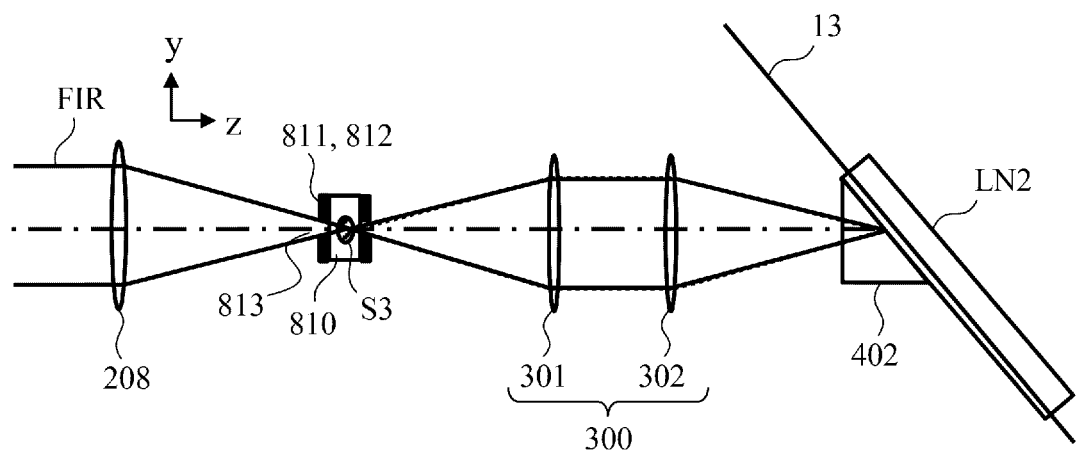
[FIG. 7B]
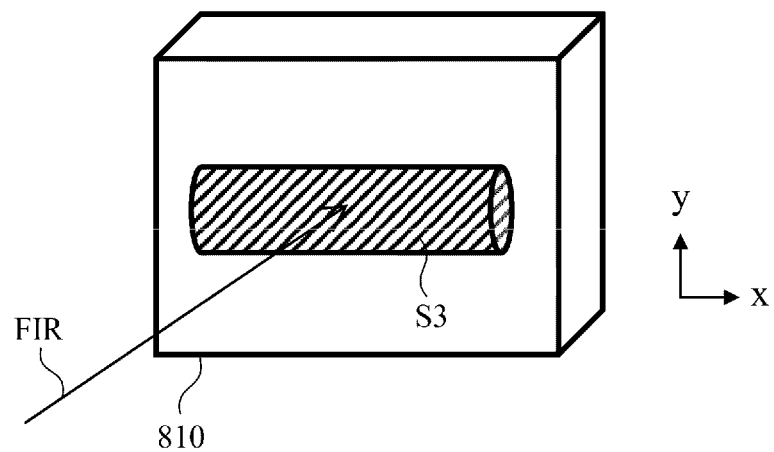

[FIG. 7C]
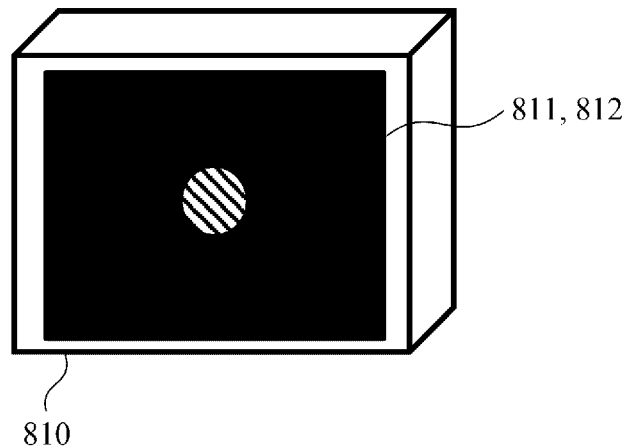
[FIG. 7D]
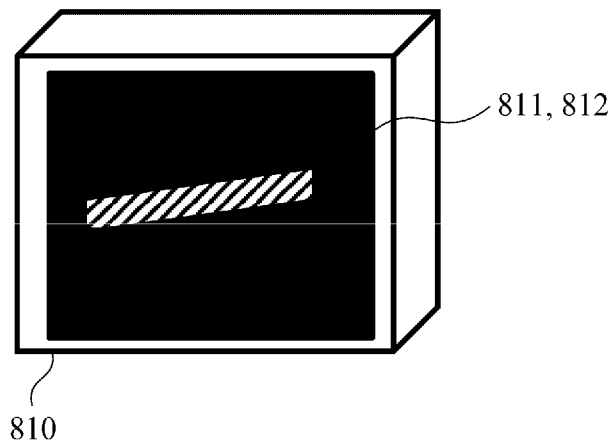

[FIG. 8]
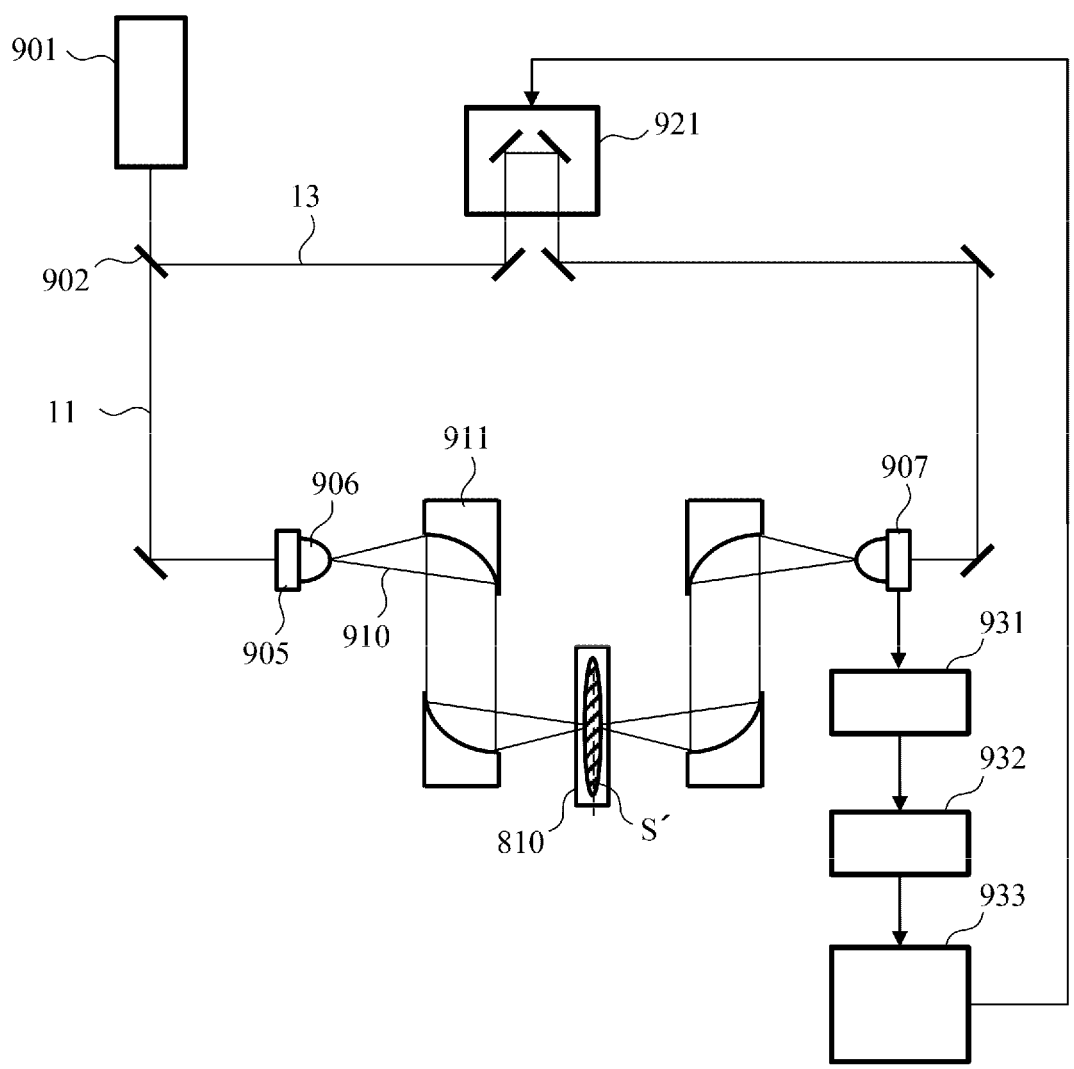

FAR-INFRARED SPECTROSCOPY DEVICE AND SAMPLE ADAPTER

TECHNICAL FIELD

The present invention relates to a far-infrared spectroscopy device that analyzes a sample using light in a far-infrared region, and a sample adapter.

BACKGROUND ART

Far-infrared light in a wavelength range of about 25 μm to 4 mm is also referred to as a terahertz wave. The terahertz wave has high transmittance to a substance, and many substances have a peak of a unique absorption spectrum in the wavelength region. Therefore, even in the case of a substance having low transmittance for visible light or infrared light or a substance contained in a shielding material, radiating the terahertz wave to obtain an absorption spectrum of the substance is also expected to be useful for analyzing the substance.

A time domain spectroscopy (TDS) method is known as a technique in this field. Although the TDS method is useful for ingredient identification of a pharmaceutical product, a quantitative analysis of an active ingredient, and the like, the TDS method has a problem of a narrow dynamic range. An injection-seeded THz parametric generator (is-TPG) method having strong peak power is known as another method for dealing with this problem. According to the is-TPG method, for example, a tablet sample having a thickness of several millimeters may be measured.

PTL 1 discloses a far-infrared spectroscopy device using the is-TPG method. In the is-TPG method, when a far-infrared line is generated, two near-infrared laser light beams (a pump light beam having high pulse energy and a seed light beam having a single wavelength) are introduced into a generation nonlinear optical crystal, and a pulsed far-infrared line (is-TPG light) having a single wavelength is parametrically oscillated. A frequency of the is-TPG light to be generated can be changed by changing a wavelength of the seed light and adjusting an incident angle to the nonlinear optical crystal. A sample is irradiated with the generated is-TPG light, transmitted light is introduced into a detection nonlinear optical crystal to convert the light into near-infrared light again, and the near-infrared light is detected by a detector, thereby analyzing the sample.

However, in the spectroscopy device as disclosed in PTL 1, when a sample S has a nonplanar (for example, curved surface) shape, the is-TPG light is refracted at an interface of the sample S, and cannot be appropriately introduced into a detection nonlinear optical crystal, and efficiency of converting the light into near-infrared light may be poor, which affects measurement accuracy.

CITATION LIST

Patent Literature

PTL 1: WO2019/116461

SUMMARY OF INVENTION

Technical Problem

An object of the invention is to provide a far-infrared spectroscopy device and a sample adapter capable of measuring a nonplanar sample with high accuracy.

Solution to Problem

In order to solve the above problem, far-infrared spectroscopy device according to the invention includes an illumination optical system configured to condense far-infrared light on a sample, and a detector configured to detect far-infrared light transmitted from the sample. A sample adapter is installed on an optical path of the far-infrared light between the illumination optical system and the sample and on an optical path between the sample and the detection optical element. A front surface of the sample adapter has substantially a planar shape, and a surface shape of the sample adapter on a sample side substantially matches with a shape of the sample. A surface of the sample where the far-infrared light is condensed and a surface of the sample that transmits the far-infrared light are curved surfaces.

Advantageous Effects of Invention

According to the invention, it is possible to provide a far-infrared spectroscopy device and a sample adapter capable of measuring a nonplanar sample with high accuracy.

BRIEF DESCRIPTION OF DRAWINGS

FIG. 1A is a schematic diagram showing an overall configuration of a far-infrared spectroscopy device 1 according to a first embodiment of the invention.

FIG. 1B is a vector diagram showing a relationship among light beams in the device shown in FIG. 1.

FIG. 2A is schematic diagram showing a state in which far-infrared light FIR is condensed by a detection optical system 300 when a sample S has a planar shape.

FIG. 2B is a schematic diagram showing a state in which the far-infrared light FIR is condensed by the detection optical system 300 when the sample S has a planar shape.

FIG. 2C is a schematic diagram showing a state in which the far-infrared light FIR is condensed by the detection optical system 300 when the sample S has a planar shape.

FIG. 3A is a schematic diagram showing a state in which the far-infrared light FIR is condensed by the detection optical system 300 when the sample S has a curved surface shape.

FIG. 3B is a schematic diagram showing a state in which the far-infrared light FIR is condensed by the detection optical system 300 when the sample S has a curved surface shape.

FIG. 3C is a schematic diagram showing a state in which the far-infrared light FIR is condensed by the detection optical system 300 when the sample S has a curved surface shape.

FIG. 4A is a schematic diagram showing effects of the far-infrared spectroscopy device 1 and a sample adapter 800 according to the first embodiment.

FIG. 4B is a schematic diagram showing effects of the far-infrared spectroscopy device 1 and the sample adapter 800 according to the first embodiment.

FIG. 4C is a schematic diagram showing effects of the far-infrared spectroscopy device 1 and the sample adapter 800 according to the first embodiment.

FIG. 5 is a schematic diagram showing the sample adapter 800 according to a second embodiment of the invention.

FIG. 6A is a schematic diagram showing the sample adapter 800 according to the second embodiment of the invention.

FIG. 6B is a schematic diagram showing the sample adapter 800 according to the second embodiment of the invention.

FIG. 7A is a schematic diagram showing the sample adapter 800 according to a third embodiment of the invention.

FIG. 7B is a schematic diagram showing the sample adapter 800 according to the third embodiment of the invention.

FIG. 7C is a schematic diagram showing the sample adapter 800 according to the third embodiment of the invention.

FIG. 7D is a schematic diagram showing the sample adapter 800 according to the third embodiment of the invention.

FIG. 8 is a schematic diagram showing a configuration example of a far-infrared spectroscopy device using a THz-TDS method.

DESCRIPTION OF EMBODIMENTS

Hereinafter, embodiments will be described with reference to the accompanying drawings. In the accompanying drawings, functionally the same elements may be denoted by the same reference numerals. The accompanying drawings show embodiments and implementation examples according to the principle of the disclosure, but the embodiments and the implementation examples are provided for understanding of the invention and are not used to limit the disclosure in any way. Description of the present specification is merely a typical example, and is not intended to limit the scope of claims or application examples of the present disclosure in any way.

Embodiments are described in sufficient details for a person skilled in the art to implement the disclosure, but it should be understood that other implementations and aspects are possible, and changes in configuration and structure and replacement of various elements are possible without departing from the scope and spirit of the technical idea of the disclosure. Therefore, the following description is not to be construed as being limited thereto.

First Embodiment

An overall configuration of a far-infrared spectroscopy device 1 according to a first embodiment of the invention will be described with reference to a schematic diagram of FIG. 1A. The far-infrared spectroscopy device 1 is a device that analyzes a sample S by irradiating the sample S with far-infrared light. The far-infrared spectroscopy device 1 includes, for example, a wavelength variable far-infrared light source 100, an illumination optical system 200, a detection optical system 300, a detection nonlinear optical crystal holding unit 400, a photodetector 500, a control unit 600, and a signal processing unit 700. As will be described later, the sample S to be measured by the far-infrared spectroscopy device 1 is stored in a sample adapter 800. The sample adapter 800 is disposed downstream of the illumination optical system 200 and upstream of the detection optical system 300.

The wavelength variable far-infrared light source 100 includes therein a nonlinear optical crystal LN1 for generating far-infrared light used for measuring the sample S, and a wavelength of the far-infrared light of the wavelength variable far-infrared light source 100 can be changed. The illumination optical system 200 is an optical system that irradiates the sample S with the far-infrared light. The detection optical system 300 is an optical system that guides the far-infrared light that passed through the sample S to the detection nonlinear optical crystal holding unit 400. The detection nonlinear optical crystal holding unit 400 holds a detection nonlinear optical crystal LN2 therein, and converts incident far-infrared light into near-infrared light. The photodetector 500 is a detector for detecting the near-infrared light. The control unit 600 is a control device that controls the illumination optical system 200 and the like, and the signal processing unit 700 executes predetermined signal processing on a signal detected by the photodetector 500.

The wavelength variable far-infrared light source 100 includes a pulse laser light source 110 (a pump light source) that emits pump light 11, a wavelength variable light source 120 that emits seed light 12, and an automatic translation stage 130. The pump light 11 and the seed light 12 have different wavelengths. A part of the pump light 11 is incident on the automatic translation stage 130 via a branching element such as a half mirror 123, and the remaining part of the pump light 11 is pump light incident on a detection nonlinear optical crystal to be described later. The seed light 12 is incident on the automatic translation stage 130 via an incident angle adjusting mechanism 121 and a mirror 122. The incident angle adjusting mechanism 121 adjusts an incident angle at which the seed light 12 is incident on the generation nonlinear optical crystal LN1.

The automatic translation stage 130 includes the generation nonlinear optical crystal LN1 therein. When the pump light 11 and the seed light 12 which are laser light having different wavelengths are incident on the generation nonlinear optical crystal LN1, far-infrared light FIR is generated by parametric generation. This method is referred to as an is-TPG method. The far-infrared light generated by the is-TPG method is referred to as is-TPG light. For example, when MgO: LiNbO$_3$ is used as the generation nonlinear optical crystal LN1, a pulsed oscillation Q-switched YAG laser (wavelength: 1064 nm) is used as the pulse laser light source 110, and the seed light 12 emitted from the wavelength variable light source 120 is incident on the generation nonlinear optical crystal LN1, the far-infrared light FIR can be obtained by parametric generation. The wavelength variable light source 120 may be a continuous oscillation laser.

A generation Si prism 132 is attached to a side surface of the generation nonlinear optical crystal LN1. Accordingly, the generated far-infrared light FIR can be efficiently extracted. A frequency of the generated far-infrared light FIR (the is-TPG light) can be changed in a range of, for example, about 0.5 THz to 5 THz by changing a wavelength of the seed light 12 in a range of, for example, about 1066 nm to 1084 nm and adjusting an incident angle of the seed light 12 on the generation nonlinear optical crystal LN1.

FIG. 1B is a vector diagram showing a relationship among light beams. When a frequency of the generated far-infrared light FIR is defines as $\omega_T$, a frequency of the pump light 11 is defines as $\omega_P$, and a frequency of the seed light 12 is defined as $\omega_S$, $\omega_T = \omega_P - \omega_S$ (Equation 1) is established. Further, when wave number vectors of the far-infrared light FIR, the pump light 11, and the seed light 12 are respectively defined as $\vec{k}_T$, $\vec{k}_P$, and $\vec{k}_S$, $\vec{k}_T = \vec{k}_P - \vec{k}_S$ (Equation 2) is established. The generated far-infrared light FIR (0.5 THz to 5 THz) is extracted into the air through the generation Si prism 132 at an angle of about 48° to 36° relative to the pump light 11.

LiNbO$_3$ serving as an example of a material of the generation nonlinear optical crystal LN1 strongly absorbs far-infrared light of 3 THz or more. Therefore, it is known that the pump light 11 and the seed light 12 are introduced to positions as close as possible to an end surface (a surface connected to the generation Si prism 132) of the generation nonlinear optical crystal LN1 in order to make a distance over which the generated far-infrared light FIR passes through an inner side of the generation nonlinear optical crystal LN1 as short as possible. As the distance over which the far-infrared light FIR passes through the inner side of the generation nonlinear optical crystal LN1 is reduced, an amount of the far-infrared light FIR absorbed by the generation nonlinear optical crystal LN1 can be reduced.

However, when the pump light 11 and the seed light 12 are incident on an end face side of the generation nonlinear optical crystal LN1 as close as possible, there is another problem that the far-infrared light cannot be generated efficiently. That is, when low-frequency far-infrared light of 1 THz or less is generated, absorption of the low-frequency far-infrared light inside the generation nonlinear optical crystal LN1 can be reduced. However, since the pump light 11 is vignetted at a crystal end, all energy cannot be introduced into a crystal, and an optical path length at which an interaction between the pump light 11 and the far-infrared light FIR occurs is reduced, generation efficiency of the far-infrared light FIR is reduced. Therefore, there is another problem that the far-infrared light FIR cannot be generated efficiently.

Therefore, in the far-infrared spectroscopy device according to the embodiment, when far-infrared light having a low frequency of 1 THz or less is generated, the pump light 11 and the seed light 12 are radiated to the vicinity of a center of the generation nonlinear optical crystal LN1. All energy can be introduced into the generation nonlinear optical crystal LN1 without vignetting the pump light 11 at a crystal end. Accordingly, a distance over which the far-infrared light FIR passes through the inner side of the generation nonlinear optical crystal LN1 induced by the pump light 11 is increased in a period up to when the far-infrared light FIR exits the generation nonlinear optical crystal LN1, and thus a long distance over which an interaction between the pump light 11 and the far-infrared light FIR occurs can be ensured and generation efficiency of the far-infrared light FIR can be improved. Since absorption of the far-infrared light of 1 THz or less inside the generation nonlinear optical crystal LN1 is small, there is no problem even when far-infrared light is generated in a central portion of a crystal.

In the first embodiment, the generation nonlinear optical crystal LN1 and the generation Si prism 132 are moved in a y'-axis direction relative to the pump light 11 by using the automatic translation stage 130 according to a frequency of the generated far-infrared light FIR. Accordingly, incident positions of the pump light 11 and the seed light 12 on the generation nonlinear optical crystal LN1 are changed. In this manner, in the far-infrared light FIR having a low frequency of 1 THz or less, a sufficiently long optical path length at which an interaction between the pump light 11 and the far-infrared light FIR occurs can be ensured, and in the far-infrared light FIR having a high frequency of 3 THz or more, far-infrared light can be efficiently generated without being absorbed in a crystal.

Excessive light emitted from the generation nonlinear optical crystal 130 is recovered or discarded by a damper 134. In the detection nonlinear optical crystal LN2 to be described later, excessive light is recovered and discarded by a damper 404.

The illumination optical system 200 includes, for example, a mirror 201, a condensing lens 202, an automatic translation stage 203, a slit 204, a rotation stage 205, and condensing lenses 207 and 208. The illumination optical system 200 is an optical system that guides the far-infrared light FIR emitted from the wavelength variable far-infrared light source 100 to the sample S.

The automatic translation stage 203 includes the slit 204 therein, and the position of the slit 204 is adjusted by the control unit 600. When an emission angle of the far-infrared light FIR changes due to a change in a frequency of the far-infrared light FIR, the rotation stage 205 adjusts a rotation amount to adjust an angle of the mirror 206 provided in the rotation stage 205. The far-infrared light FIR reflected by the mirror 206 is converted into parallel light by the condensing lens 207, and is condensed again toward the sample S by the condensing lens 208.

The sample S is placed at a position where the far-infrared light FIR is condensed by the condensing lens 208. The far-infrared light FIR that passed through the sample S is incident on the detection nonlinear optical crystal holding unit 400 from the detection optical system 300. The detection nonlinear optical crystal holding unit 400 includes therein the detection nonlinear optical crystal LN2 and a detection Si prism 402 connected to a side surface of the detection nonlinear optical crystal LN2.

The far-infrared light FIR is introduced into the detection nonlinear optical crystal LN2 through the detection Si prism 402. The far-infrared light FIR intersects, in the detection nonlinear optical crystal LN2, with near-infrared light 13 that branches at the half mirror 123 and a mirror 209, thereby parametrically oscillating near-infrared light (detection light NIR) having a wavelength in the vicinity of 1066 nm to 1084 nm. In this case, when Rayleigh lengths of the near-infrared light 13 and the far-infrared light FIR in the detection nonlinear optical crystal LN2 are set to be the same in the vicinity of an intersection region, generation efficiency of the detection light NIR can be improved. The detection light NIR is photoelectrically converted by the photodetector 290 having sensitivity to near-infrared light and is detected as a detection signal.

Condensing of the far-infrared light FIR by the detection optical system 300 will be described with reference to FIGS. 2A to 2C and FIGS. 3A to 3C. FIGS. 2A to 2C show a state of condensing the far-infrared light FIR when a front surface of the sample S has a planar shape (the planar sample S). FIGS. 3A to 3C show a state of condensing the far-infrared light FIR when a front surface of a sample S' has a curved surface shape (a curved surface sample S'). FIGS. 2A and 3A show a case where the samples S and S' coincide with a condensing position of the condensing lens 208, FIGS. 2B and 3B show a case where the samples S and S' are disposed in front of the condensing position of the condensing lens 208, and FIGS. 2C and 3C show a case where the samples S and S' are disposed behind the condensing position of the condensing lens 208.

When the front surface of the sample S has a planar shape, as shown in FIGS. 2A to 2C, the far-infrared light FIR is not greatly refracted by the sample S in any of the case where the sample S is disposed at the condensing position of the condensing lens 208, the case where the sample S is disposed in front of the condensing position, and the case where the sample S is disposed behind the condensing position. Therefore, a condensing position of the far-infrared light FIR in the detection nonlinear optical crystal LN2 does not change greatly.

On the other hand, when the front surface of the sample S' is a nonplanar surface, for example, is a convex curved surface, as shown in FIG. 3A, even when the sample S' is disposed at the condensing position of the condensing lens 208, due to a lens effect of the sample S' having the curved surface shape, a condensing position in the detection nonlinear optical crystal LN2 is located at a position in front of that in a case where the sample S has a planar shape.

As shown in FIG. 3B, when the sample S' has a convex curved surface shape and the sample S' is disposed at a position in front of the condensing position of the condensing lens 208, a condensing position in the detection nonlinear optical crystal LN2 is located at a position further in front of that in a case where the sample S has a planar shape (FIG. 2B), and a difference between positions is much larger than a difference between FIG. 2A and FIG. 3A.

As shown in FIG. 3C, when the sample S' has a convex curved surface shape and the sample S' is disposed at a position behind the condensing position of the condensing lens 208, a condensing position in the detection nonlinear optical crystal LN2 is located at a position further in front of that in a case where the sample S has a planar shape (FIG. 2B), and a difference between positions is much larger than a difference between FIG. 2A and FIG. 3A.

In this manner, when the far-infrared light FIR is not appropriately condensed in the detection nonlinear optical crystal LN2, the detection light NIR cannot be efficiently generated in the detection nonlinear optical crystal LN2, and an absorption spectrum cannot be correctly observed. When the sample S is placed with high positional accuracy, this problem is solved to some extent, but when there is a lens effect of the sample S, the far-infrared light cannot be sufficiently condensed in the detection nonlinear optical crystal LN2. Such a problem occurs not only in a case where the front surface of the sample S is a convex surface but also in a case where the front surface of the sample S is a concave surface or in a case where the front surface of the sample S has another nonplanar shape.

In a general spectroscopy in which light in a wavelength region of deep ultraviolet light to infrared light is used as measurement light, since light transmitted through a sample can be detected with a large numerical aperture (NA) by using an integrating sphere, a surface shape of a sample does not cause a problem. On the other hand, in the case of a device using far-infrared light as measurement light, an integrating sphere cannot be used. Therefore, when measuring a sample having a curved surface shape, it is difficult to detect transmitted light with high efficiency. This is a problem not only in a device employing the is-TPG method as in the far-infrared light spectroscopy device according to the embodiment, but also in a device employing the TDS method.

Therefore, as shown in FIGS. 4A to 4C, the sample adapter 800 is adopted such that an incident surface and an emission surface of the far-infrared light FIR with respect to the curved surface sample S' are flat in the device according to the first embodiment. The sample adapter 800 may have a divided shape in a manner of sandwiching the sample S', or may have a hollow portion capable of accommodating the sample S' therein. An outer shape of the sample adapter 800 may be a planar shape. A front surface of the sample adapter 800 on a sample S' side has a shape substantially matching with a surface shape of the sample S'. It is preferable that a material of the sample adapter 800 has a refractive index of 1 or more for far-infrared light and has high transmittance for far-infrared light.

It is preferable that a curvature of the sample adapter 800 on a sample side (an inner wall surface) is substantially the same as a curvature of a curved surface of the sample S', and the curvatures may be different. Specifically, it is sufficient that the sample adapter 800 and the sample S' has a curvature difference to such an extent that a lens effect is not applied to the far-infrared line FIR passing through the sample S'. The front surface of the sample S' and the front surface of the sample adapter 800 on the sample side may or may not be in contact with each other. A gap between the surface of the sample S' and the surface of the sample adapter 800 on the sample side is preferably smaller than a wavelength of the far-infrared light FIR. It is not necessary to polish the front surface of the sample adapter 800 with high accuracy, and it is sufficient that front surface roughness of the sample adapter 800 is equal to or less than a wavelength of the far-infrared light FIR. An incident surface and an emission surface of the sample S' are not necessary to be parallel to each other.

When such a sample adapter is used in a general spectroscopy in which light in a wavelength region of deep ultraviolet light to infrared light is used as measurement light, since a wavelength of the measurement light is short, it is necessary to reduce a gap (for example, hundreds of nanometers to several micrometers) between a curved surface sample and the adapter, and an adapter that matches with a curvature of the curved surface sample with high accuracy is needed. Therefore, in the device in which light in a wavelength region of deep ultraviolet light to infrared light is used as measurement light, measurement using a sample adapter is not possible, and a measurement method using an integrating sphere is considered to be suitable.

In a wavelength region (about 0.5 THz to 5 THz) targeted by the far-infrared spectroscopy device according to the first embodiment, it is possible to produce a sample adapter using a material having a high transmittance and a substantially constant refractive index in the band. Since a wavelength of the far-infrared light is hundreds of micrometers and there is no problem even when there is a gap between the sample S' and the sample adapter 800 substantially equal to the wavelength, it is possible to measure a plurality of curved surface samples having different curvatures using one sample adapter 800.

Since measuring an object obtained by combining the sample adapter 800 and the curved surface sample S' is equivalent to measuring the planar sample S using the far-infrared light FIR, the transmitted far-infrared light FIR is appropriately condensed in the detection nonlinear optical crystal LN2 using lenses 301 and 302 and the like, and the detection light NIR can be efficiently generated by merging the near-infrared light 13 and the far-infrared light FIR. That is, as shown in FIGS. 4B and 4C, even when a position of the sample adapter 800 is disposed in front of or behind a condensing position of the far-infrared light FIR condensed by the condensing lens 208, the far-infrared light FIR can be appropriately introduced into the detection nonlinear optical crystal LN2, and a robust optical system can be constructed. Even when the sample S' and the sample adapter 800 are inclined relative to the far-infrared light FIR, focal positions of the lenses 301 and 302 do not change in an optical axis direction, and the focal positions only shift in a y direction as shown in FIG. 4, which does not greatly affect detection efficiency. As described above, according to the far-infrared spectroscopy device 1 and the sample adapter 800 in the first embodiment, it is possible to measure a nonplanar sample with high accuracy.

Second Embodiment

Next, a far-infrared spectroscopy device according to a second embodiment will be described with reference to FIG. 5. In the far-infrared spectroscopy device according to the second embodiment, a structure of the sample adapter 800 is different from that of the sample adapter 800 according to the first embodiment. Other structures of the far-infrared spectroscopy device are the same as those in the first embodiment, and thus redundant description will be omitted below. The second embodiment is suitable for a sample S2 having a small size, for example, a sample having a size equal to a beam diameter of the radiated far-infrared light FIR at the time of condensing the far-infrared light FIR.

The sample adapter 800 includes a main body portion 810 and an absorbing material 811 formed on a front surface and a back surface of the main body portion 810. The main body portion 810 may be divided in a manner of sandwiching the sample S2, or may have a structure having a hollow portion into which the sample can be inserted. The absorbing material 811 is made of a material having a property of absorbing the far-infrared light FIR. The absorbing material 811 has an opening portion 813 near a center of the absorbing material 811, and the far-infrared light FIR passes (is not absorbed) through the opening portion 813. A surface shape of the main body portion 810 is substantially a planar shape. The surface shape of the absorbing material 811 may be substantially a planar shape or a curved surface shape.

A size of the opening portion 813 substantially matches with a position of the sample S2 disposed in the main body portion 810, and the far-infrared light FIR that passed through the opening portion 813 passes through the sample S2, further passes through the opening portion 813 on the back surface, and is incident on the detection optical system 300. The size of the opening portion 813 is not limited to a specific size, and for example, it is preferable that the size of the opening portion 813 substantially matches with a size of the sample S2. For example, when the size of the sample S2 is several millimeters, the size of the opening portion 813 is also set to about several millimeters.

As described above, the second embodiment is suitable for a case of measuring the small sample S2 having a size equal to a beam diameter of the radiated far-infrared light FIR at the time of condensing the far-infrared light FIR. When the small sample S2 is directly irradiated with the far-infrared light FIR, most of the far-infrared light FIR having h a Gaussian distribution is transmitted through the sample S2, is incident on the detection nonlinear optical crystal LN2, and is converted into the near-infrared light NIR. However, a part of the far-infrared light FIR, for example, light of a bottom portion of the Gaussian distribution may be introduced into the detection nonlinear optical crystal LN2 without being radiated to the sample S2, and may be converted into near-infrared light. Since the far-infrared light FIR transmitted through the sample 202 is absorbed or scattered by the sample S2, an intensity of the transmitted far-infrared light FIR is very small, but the far-infrared light FIR that is not transmitted through the sample S2 is not attenuated.

Depending on an absorption coefficient of the sample S2 for the far-infrared light, an intensity of the near-infrared light obtained by converting the far-infrared light FIR that does not pass through the sample S2 may be higher than an intensity of the near-infrared light obtained by converting the far-infrared light FIR transmitted through the sample S2. In this case, an absorption spectrum is greatly affected by the near-infrared light obtained by converting the far-infrared light FIR that does not pass through the sample S2, and a transmission absorption spectrum cannot be correctly measured. This phenomenon occurs in a similar manner in a case where the front surface of the sample S2 is a planar surface and in a case where the front surface of the sample S2 is a curved surface. As shown in FIG. 5, when the front surface of the sample S2 is a curved surface, generation efficiency of detection light deteriorates as described in the first embodiment, and thus it may be more difficult to accurately observe an absorption spectrum.

In the second embodiment, the absorbing material 811 having the opening portion 813 that has substantially the same size as the sample S2 is provided on the front surface and the back surface of the main body portion 810 of the sample adapter 800. Accordingly, the far-infrared light FIR that does not pass through the sample S2 can be blocked. A shape of the opening portion 813 is not particularly limited, and may be, for example, circular, elliptical, square, or rectangular. A material of the absorbing material 811 is not limited to a specific material as long as the absorbing material 811 can absorb the far-infrared light FIR. It is preferable to set an attenuation rate to an extent that the absorbing material 811 can attenuate the incident far-infrared light FIR to less than half of an intensity. When a material having a low attenuation rate is used as the absorbing material 811, as shown in FIGS. 6A and 6B, a shielding material 812 that can shield the far-infrared light FIR and the absorbing material 811 can be combined.

A shielding material 212 can be made of a metal material such as aluminum capable of reflecting far-infrared light with high reflectivity. In this case, light reflected by the shielding material 812 may be further reflected by another optical system or a structure and becomes stray light, and the stray light may be introduced into the detection nonlinear optical crystal LN2 and observed as detection light. In order to prevent this problem, as shown in FIGS. 6A and 6B, it is preferable to provide the absorbing material 811 without providing the shielding material 812 on outermost surfaces on incident and emission sides of the far-infrared light FIR. In the arrangement shown in FIG. 6A, the far-infrared light may be reflected by the metallic shielding material 812 behind the sample S2 and further reflected by the metallic shielding material 812 in front of the sample S2, and then the reflected far-infrared d light is observed. Therefore, the metallic shielding material 812 may be disposed in a manner of being interposed between the absorbing materials 811 as shown in FIG. 6B.

Third Embodiment

Next, a far-infrared spectroscopy device according to a third embodiment will be described with reference to FIG. 7A. In the far-infrared spectroscopy device according to the third embodiment, the structure of the sample adapter 800 is different from that of the sample adapter 800 in the above-described embodiments. Other structures of the far-infrared spectroscopy device are the same as those in the above-described embodiments, and thus redundant description will be omitted below. The third embodiment is suitable for a sample S3, such as a pharmaceutical caplet tablet, in which an aspect ratio of the sample is different and a length in a short direction is substantially equal to a size of a beam diameter of the far-infrared light FIR at the time of condensing the far-infrared FIR.

Similar to the sample adapter 800 according to the second embodiment, the sample adapter 800 includes the main body portion 810, the absorbing material 811 formed on the front surface and the back surface of the main body portion 810, and the shielding material 812. The main body portion 800 may be divided in a manner of sandwiching the sample S3, or may have a structure having a hollow portion into which the sample S3 can be inserted. The absorbing material 811 is made of a material having a property of absorbing the far-infrared light FIR. The absorbing material 811 has the opening portion 813 near a center of the absorbing material 811, and the far-infrared light FIR passes through the opening portion 813. A surface shape of the main body portion 810 is substantially a planar shape, and a surface shape of the absorbing material 811 is also substantially a planar shape. The opening portion 813 has a long side corresponding to a length in a longitudinal direction of the sample S3 and a short side along a length in a short direction of the sample S3.

In the is-TPG method, a generation angle (180−γ in FIG. 1B) of the far-infrared light FIR relative to the near-infrared light NIR differs depending on a generated frequency. Therefore, as shown in FIG. 7B, in a case where a long axis of the sample S3 is set in an x direction, even when a frequency of the far-infrared light FIR changes, it is not necessary to determine a position of the sample S3 with high accuracy or to determine an angle of a mirror with high accuracy using an automatic translation stage for sample (not shown) so that the far-infrared light does not shift in the x direction. In this case, a shape of a hole for allowing the far-infrared light to pass through the absorbing material 211 and the shielding material 212 may be a circular shape or a square shape which is the same as a shape of a far-infrared beam as shown in FIG. 7C, or may be a rectangular shape or an elliptical shape as shown in FIG. 7D. When the shape of the hole is a rectangular shape or an elliptical shape, it is not necessary to perform positioning with high accuracy as described above, and a robust optical system can be constructed.

Others

A device using the is-TPG method is described as an example in the embodiments of the invention described above. However, the invention is not limited thereto, and is also applicable to a device using a terahertz time domain spectroscopy (a THz-TDS method). FIG. 8 is a schematic diagram showing a configuration example of a far-infrared spectroscopy device using the THz-TDS method. In this device, near-infrared light emitted from a femtosecond laser 901 is split into the pump light 11 and probe light 13 by a beam splitter 902. The pump light 11 is introduced into a far-infrared light generation element 905, and the far-infrared light generation element 905 generates the far-infrared light FIR based on the pump light 11. The far-infrared light FIR is converged by a silicon lens 906, and then radiated onto the sample adapter 800 including the curved surface sample S' using an off-axis parabolic mirror 911. Far-infrared light transmitted through the curved surface sample S' and the sample adapter 800 is radiated on a detection element 907 through an off-axis parabolic mirror 911'. The probe light 13 is introduced into the detection element 907 through a movable mirror 921 for giving a time delay. A detection signal of the detection element 907 is amplified by a preamplifier 931, and then a frequency spectrum is analyzed by a lock-in amplifier 932. A control unit 932 controls the entire device. A time waveform of an oscillating electric field of pulse waves of the far-infrared light FIR is measured while shifting a timing at which the probe light 13 reaches the detection element 907 by moving the movable mirror 921 on an optical path of the probe light 13.

The invention is not limited to the above-described embodiments, and includes various modifications. For example, the embodiments described above have been described in detail to facilitate understanding of the invention, and the invention is not necessarily limited to those including all the configurations described above. Further, a part of a configuration according to a certain embodiment can be replaced with a configuration according to another embodiment, and a configuration according to another embodiment can be added to a configuration according to a certain embodiment. It is possible to add, delete, or replace a part of configurations of each embodiment with another configuration. Some or all of configurations, functions, processing units, processing methods, and the like described above may be implemented by hardware by, for example, designing with an integrated circuit. In addition, the above configurations, functions, and the like may be implemented by software by a processor interpreting and executing a program for implementing each function. Information such as a program, a table, and a file for implementing a function can be stored in a recording device such as a memory, a hard disk, and a solid state drive (SSD), or in a recording medium such as an IC card, an SD card, and a DVD.

REFERENCE SIGNS LIST

1: far-infrared spectroscopy device
100: wavelength variable far-infrared light source
200: illumination optical system
300: detection optical system
400: detection nonlinear optical crystal holding unit
500: photodetector
600: control unit
700: signal processing unit
110: pulse laser light source
120: wavelength variable light source
121: incident angle adjusting mechanism
122: mirror
123: half mirror
11: pump light
12: seed light
LN1: generation nonlinear optical crystal
130: automatic translation stage
132: generation Si prism
134: damper
201: mirror
202: condensing lens
203: automatic translation stage
204: slit
205: rotation stage
206: mirror
207, 208: condensing lens
301, 302: lens
LN2: detection nonlinear optical crystal
402: detection Si prism
404: damper
800: sample adapter
810: main body portion
811: absorbing material
812: shielding material
901: femtosecond laser
902: beam splitter
905: far-infrared light generation element
906: silicon lens
907: detection element
911, 911': parabolic mirror
921: movable mirror

The invention claimed is:
1. A far-infrared spectroscopy device comprising:
an illumination optical system, including a condensing lens, configured to condense far-infrared light on a sample; and a detector configured to detect far-infrared light transmitted from the sample, wherein
a sample adapter is installed on an optical path of the far-infrared light between the illumination optical system and the sample and on an optical path between the sample and the detection optical element,
a front surface of the sample adapter opposite to a sample side has substantially a planar shape,
a surface shape of the sample adapter on the sample side substantially matches with a shape of the sample, and
a surface of the sample where the far-infrared light is condensed and a surface of the sample that transmits the far-infrared light are curved surfaces,
wherein the sample adapter has a constant refractive index of 1 or more in a band of the far-infrared light with respect to the far-infrared light, and
wherein the sample adapter is configured to, when the sample adapter is installed, have a gap between a surface of the sample adapter at the sample's side and the sample, the gap corresponding to a wavelength of the far-infrared light.

2. The far-infrared spectroscopy device according to claim 1, further comprising:
a pump light source configured to emit pump light that is near-infrared light;
a wavelength variable light source configured to emit seed light;
a first nonlinear optical crystal configured to generate far-infrared light by parametric generation of the pump light and the seed light; and
a second nonlinear optical crystal configured to convert the far-infrared light that passed through the sample into near-infrared light.

3. The far-infrared spectroscopy device according to claim 1, wherein
the sample adapter further includes an absorbing material that is disposed on a front surface of a main body portion and has an opening portion through which the far-infrared light passes.

4. The far-infrared spectroscopy device according to claim 3, further comprising:
a light shielding material that is made of metal and is disposed in contact with the absorbing material.

5. The far-infrared spectroscopy device according to claim 4, wherein
the light shielding material is disposed in a manner of being interposed between the absorbing materials.

6. A sample adapter to be installed around a sample to be subjected to a far-infrared spectroscopy measurement, wherein
a front surface of the sample adapter opposite to a sample side has substantially a planar shape,
a front surface of the sample adapter on the sample side has a shape substantially matching with a shape of the sample, and
a surface of the sample where the far-infrared light is condensed and a surface of the sample that transmits the far-infrared light are curved surfaces,
wherein the sample adapter has a constant refractive index of 1 or more in a band of the far-infrared light with respect to the far-infrared light, and
wherein the sample adapter is configured to, when the sample adapter is installed, have a gap between a surface of the sample adapter at the sample's side and the sample, the gap corresponding to a wavelength of the far-infrared light.

7. The sample adapter according to claim 6, further comprising:
an absorbing material that is provided on a front surface of the sample adapter and configured to absorb far-infrared light, and a light shielding material, wherein
the absorbing material and the light shielding material each have an opening portion in a part of the absorbing material and the light shielding material.

* * * * *